B. B. GOLDSMITH.
METHOD OF MAKING RUBBER BANDS.
APPLICATION FILED APR. 29, 1914.
1,189,938.
Patented July 4, 1916.
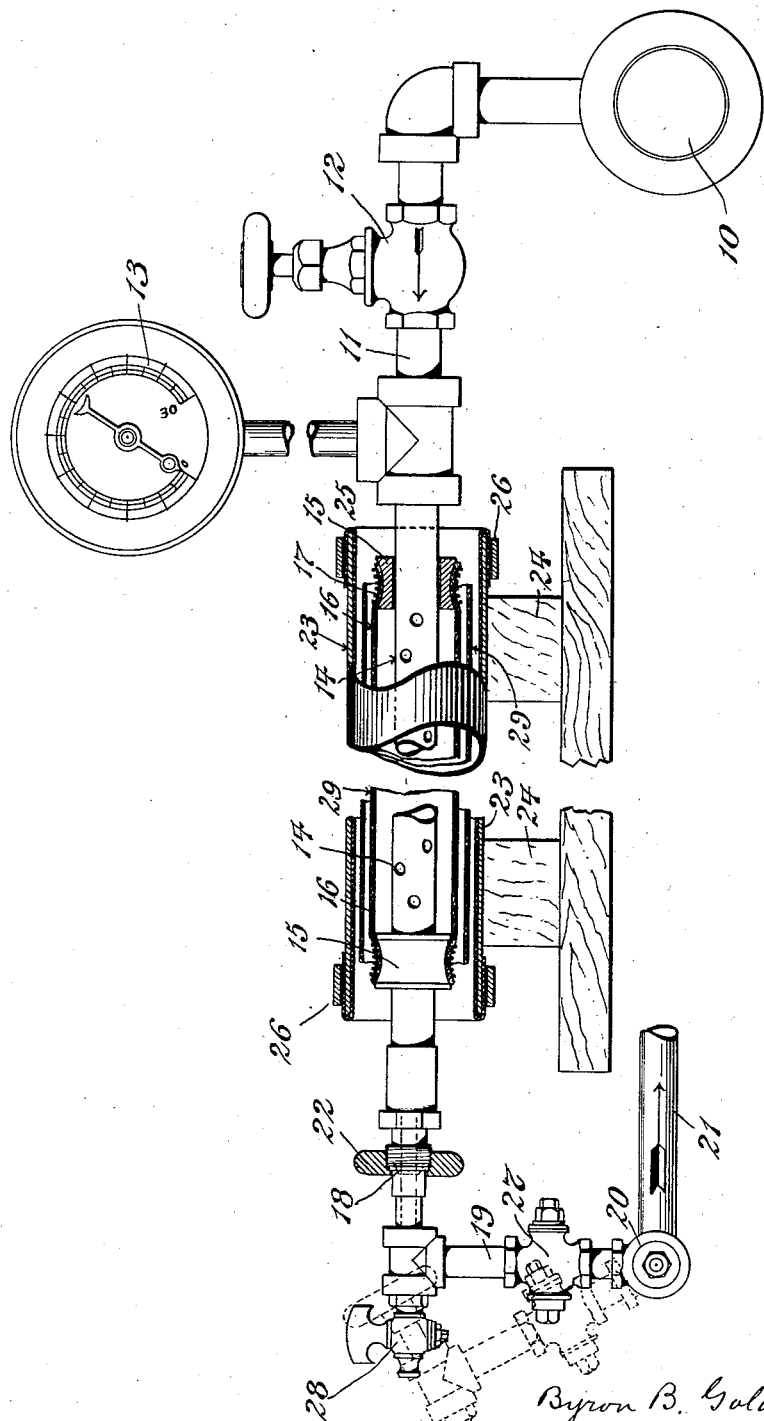
Witnesses
Edward Rowland
Katharine C. Mead.
Byron B. Goldsmith
Inventor
By his Attorneys
Wilkinson, Giusta and MacKaye

UNITED STATES PATENT OFFICE.

BYRON B. GOLDSMITH, OF NEW YORK, N. Y.

METHOD OF MAKING RUBBER BANDS.

1,189,938.  Specification of Letters Patent.  Patented July 4, 1916.

Application filed April 29, 1914. Serial No. 835,116.

*To all whom it may concern:*

Be it known that I, BYRON B. GOLDSMITH, a citizen of the United States, residing at New York, in the county of New York and State of New York, have invented certain new and useful Improvements in Methods of Making Rubber Bands; and I do hereby declare the following to be a full, clear, and exact description of the invention, such as will enable others skilled in the art to which it appertains to make and use the same.

My invention has reference to a new and improved process of manufacturing rubber bands, by means of which a great saving is accomplished in the number of operations required, and on this account much of the machinery and labor heretofore necessary is done away with. Besides this some of the defects in the product manufactured by the old process are eliminated and a better article is therefore produced.

The process in general use for the manufacture of rubber bands at the present time consists in mixing the ingredients on suitable rolls; then running this stock through a calender to produce a long sheet of rubber having the thickness required. This calendering produces a very uniform sheet which is rolled up with canvas between layers to prevent the sticking together of this sheeted rubber. From this rubber, strips are cut having a width dependent on the size of band wanted. The edges of such a strip are now cemented together lengthwise to form a tube. This tube is vulcanized and is then cut up into bands. The difficulties in this process are the calendering which requires the most expert operators and even with the greatest care, there is always considerable material which must be worked over again. Still more precarious than this is the seaming of the strips to form tubes. This seaming must be done very accurately and however great the care taken, there are always places which cannot be discovered, but which cause a weak spot in the band which is cut from the tube at that particular place. In order to perform this seaming, a number of operations are necessary. A fresh cut must be made on the edges which are to be seamed together and the two edges must be cut so accurately that when they are brought together they will meet throughout their entire length. Before bringing the fresh cut edges in contact with each other they must be coated with rubber cement or with a solvent of rubber in order to make a good joint. After the edges are brought together there must be a slight pressure exerted upon the seam to cause a union. It is very easy to understand that if the tube produced by this process is vulcanized and then cut up into bands one-eighth or one-fourth of an inch wide, any little defect in the seam will influence the band cut from the tube at that spot. Besides this no matter how well the seam is made, on repeatedly stretching the band the seam opens.

By means of my process I overcome all of the above mentioned objections and produce a better article with less labor. After mixing the stock as in the old process, I run it out into tubes on what is known as a tubing machine. Tubes thus produced are entirely seamless, but they have a rough and irregular surface which unfits them for employment in making bands without preliminary treatment. Accordingly I form these first untreated tubes with a diameter slightly smaller than that desired for actual use in making bands. The untreated tubes are placed in suitable lengths within an outer forming tube of resistant material (preferably metal) having an internal diameter suitable to the end had in view. The internal surface of the forming tube may be smooth, or it may be embossed in designs intended to appear on the surfaces of the bands. The untreated tube, being so placed, is then uniformly expanded by fluid pressure (such as steam, air or water), preferably with heat, and is so compressed outwardly against the inner surface of the forming tube as to assume exactly the right diameter; while at the same time being made smooth enough to be suitable for making rubber bands. The tube thus formed and treated or finished, is preferably first vulcanized and then cut up in the well known manner hitherto applied to tubes with seams, and thus rubber bands of any width may be made more rapidly and cheaply than heretofore, and with far better results as to quality of product.

Various forms of apparatus may be employed for carrying out the process above described, and it is to be understood that the apparatus herein shown, described and claimed is not essential to my broad invention.

In the accompanying drawing is shown my preferred steam pressure apparatus, in side elevation.

In this drawing a pipe for conveying steam (or other fluid under pressure) from a suitable source, is shown at 10; and from this a number of branch pipes 11 may be held, each commanded by its own valve 12. A gage 13 may be used to permit proper regulation of pressure as desired. The pipe 11 is suitably perforated as at 14, between two sleeves 15 over which the ends of a vulcanized rubber tube 16 are fitted and secured, as by wire coils 17, so as to produce a steam tight expansible chamber between said sleeves. The outer extremity of the pipe 11 has a nozzle 18, for discharging the steam into a branch tube section 19, adapted to turn around a pivotal joint 20 on the return pipe 21. A sleeve 22 is adapted to screw over the nozzle 18 to form a temporary junction.

The forming tube 23, is adapted to be slipped over the perforated portion of the pipe 11 and is carried on suitable supports, as 24. One means for forming embossed designs on the finally treated tube is to place embossed cloth, paper, rubber sheeting 25 (or the like) within the tube 23. In the drawing this is shown secured by suitable bands 26. These sheets may, of course, be omitted without departing from the invention. When the forming tube has been set in place, as shown, the swinging connecting pipe 19 is placed as illustrated in dotted lines and the junction secured at 22, and the valves 27 and 28 are closed. Steam is then admitted at 12, and the pressure between the sleeves 15 is brought to the proper degree, as shown by the gage 13. This can be regulated by valves 12 and 27. This pressure expands the rubber tube 16 around which the untreated and unvulcanized seamless tube 29 has been placed with the result that this latter tube is firmly compressed outward against the inner surface (removable or otherwise) of the forming tube 23, whereby it is smoothed or suitably embossed, and is given the desired uniform thickness and tubular diameter. After this process, the steam is shut off at 12, and the forming tube and treated material are removed over the end of the pipe 11, after tilting away the jointed section 19.

The use of the tube 29 is convenient, but is not essential to my broad invention, as the steam (or other fluid pressure) may be applied, by suitable arrangement of parts, directly to the interior of the tube to be treated.

Various changes may be made in the different parts of my apparatus and steps of my process without departing from the scope of my invention, and I do not limit myself to the details herein shown and described.

What I claim is—

1. The process of making bands of rubber and the like which consists in forming a section of tubing from a suitable plastic composition, subjecting said tubing to a smoothing process, vulcanizing it, and cutting the treated tube into sections of the desired width for the bands desired.

2. The process of making bands of rubber and the like which consists in forming a section of tubing from a suitable plastic composition, heating and smoothing the tubing so formed, vulcanizing it, and cutting the treated tube into sections of the desired width for the bands desired.

3. The process of making bands of rubber and the like which consists in forming a section of tubing from a suitable plastic composition, simultaneously stretching and compressing said tubing, vulcanizing it, and cutting the treated tube into sections of the desired width for the bands desired.

4. The process of making bands of rubber and the like which consists in forming a section of tubing from a suitable plastic composition, expanding said tubing and pressing its outer surface by fluid pressure against a suitably formed resistant surface, vulcanizing it, and cutting the treated tube into sections of the desired width for the bands desired.

5. The process of making bands of rubber and the like which consists in forming a section of tubing from a suitable plastic composition, simultaneously stretching, heating and compressing said tubing, vulcanizing it and cutting the treated tube into sections of the desired width for the bands desired.

6. The process of making bands of rubber and the like which consists in forming a section of tubing from a suitable plastic composition, expanding said tubing and pressing its outer surface against an embossed resistant surface, vulcanizing it, and cutting the treated tube into sections of the desired width for the bands desired.

7. The process of making bands of rubber and the like which consists in forming a section of tubing from a suitable plastic composition, expanding said tubing and heating the same while pressing it by fluid pressure against a suitable resistant surface, vlucanizing it, and cutting the treated tube into sections of the desired width for the bands desired.

8. The process of making bands of rubber and the like which consists in forming a tube from a suitable plastic composition, expanding said tube by heat and pressure against a suitable form, vulcanizing it, and cutting it into bands.

In testimony whereof, I affix my signature, in presence of two witnesses.

BYRON B. GOLDSMITH.

Witnesses:
 FRANK DREWS,
 F. J. MRAZ.